(12) United States Patent
Katoch et al.

(10) Patent No.: US 7,212,034 B2
(45) Date of Patent: May 1, 2007

(54) CURRENT MODE SIGNALING IN ELECTRONIC DATA PROCESSING CIRCUIT

(75) Inventors: Atul Katoch, Eindhoven (NL); Evert Seevinck, Nijmegen (NL); Hendricus Joseph Maria Veendrick, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/525,865

(22) PCT Filed: Jul. 31, 2003

(86) PCT No.: PCT/IB03/03390

§ 371 (c)(1),
(2), (4) Date: Oct. 24, 2005

(87) PCT Pub. No.: WO2004/021100

PCT Pub. Date: Mar. 11, 2004

(65) Prior Publication Data
US 2006/0244488 A1 Nov. 2, 2006

(30) Foreign Application Priority Data
Aug. 29, 2002 (EP) .................................. 02078546

(51) Int. Cl.
*H03K 19/0175* (2006.01)

(52) U.S. Cl. ............................ 326/82; 326/83; 326/86; 326/90

(58) Field of Classification Search ............ 326/82–83, 326/86, 90, 99
See application file for complete search history.

(56) References Cited

U.S. PATENT DOCUMENTS 5,495,186 A * 2/1996 Kanazawa et al. ............ 326/83
5,504,782 A * 4/1996 Campbell, Jr. ............... 375/259

* cited by examiner

*Primary Examiner*—Anh Q. Tran

(57) ABSTRACT

An electronic data processing circuit uses current mode signalling on a communication conductor, wherein a receiver supplies current to the communication conductor to try and keep a voltage on the conductor constant and measures the current that is needed to do so. A transition coding circuit is coupled between a data source circuit and the communication conductor, for driving the communication conductor in a first state in pulses in response to transitions in the logic signal and in a second state outside the pulses. The level that is used for indicating no change is selected so the current that needs to be supplied by the receiver is smaller when no change is signalled than when a change is signalled. Preferably only a nearly zero quiescent current is needed when there is no change.

6 Claims, 3 Drawing Sheets

CURRENT MODE SIGNALING IN ELECTRONIC DATA PROCESSING CIRCUIT

The invention relates to an electronic data processing circuit wherein a data source communicates data to a data receiver with current mode signalling.

U.S. Pat. No. 6,255,852 describes the use of current mode signalling to communicate data in an integrated circuit. During current mode signalling a transmitter circuit drives a communication conductor dependent on transmitted data. A receiver circuit supplies current to the communication conductor in order to keep the potential of the communication conductor substantially constant in spite of the driving, at least at the input of the receiver circuit. The receiver circuit measures the current that is needed to do so and the measured current value is used to reconstruct the transmitted data. Thus, in current mode signalling, there is no need to assure a minimum potential swing on the communication conductor, because the signal is detected from the current, rather than directly from the potential.

To understand its benefits current mode signalling should be contrasted with conventional voltage mode signalling, in which the receiver circuit measures the potential on the communication conductor with a high impedance circuit that minimizes counteraction of voltage changes on the communication conductor. During voltage mode signalling the transmitter circuit has to charge the capacitance that is inherent in the communication conductor. This slows down communication, increasingly when the communication conductor is longer. Thus especially in large integrated circuits, when mutually remote parts of the integrated circuit communicate with one another voltage mode signalling becomes slow.

During current mode signalling there is substantially no need to charge the capacitance of the communication conductor, since its potential remains constant. Because the current changes there may be a need to override the reaction due to the inherent inductance of the communication conductor, but in an integrated circuit the effect of the inductance is much smaller than that of the capacitance. As a result current mode signalling can proceed at a much faster data rate than voltage mode signalling, especially when using long communication conductors.

Current mode signalling requires special different receiver circuits, as compared with voltage mode signalling. U.S. Pat. No. 6,255,852 essentially uses a common gate circuit to supply and measure the current. In a common gate circuit the communication conductor is coupled to the source of a MOS transistor, whose gate is coupled to an internal voltage. The current from the drain of the MOS transistor is measured. Such a circuit presents a low input impedance to the communication conductor, which counteracts changes in the potential of the communication conductor.

An important disadvantage of current mode signalling is its power consumption. The receiver and the transmitter deliver counteracting currents to the same communication conductor. Furthermore there could be high static current drain also between Vdd and ground already at the receiving end itself. For a reasonable speed these currents need to be relatively strong. When the receiver circuit continually has to supply current to the communication line current mode signalling leads to a higher power consumption than voltage mode signalling. Although this current could be reduced by switching off the current when information has been transferred, such switching would require accurate timing signals to be generated.

Among others, it is an object of the invention to reduce power consumption involved with current mode signalling.

The electronic data processing circuit according to the invention is set forth in claim 1. By using pulses to signal transitions in the logic data from a data source in current mode signalling, and by arranging the current mode receiver circuit so that the least current is consumed in the absence of a pulse, the power consumption needed for communication is reduced, while retaining the speed advantages of current mode signalling. Each pulse needs to have a certain minimum duration so that it is detectable for the receiver circuit, but otherwise it is preferably as short as possible. In particular it need not extend for the minimum duration that the logic signal of the data source circuit can remain at a certain level (usually a clock cycle). Preferably the pulses are substantially shorter than the clock cycle, so as to minimize power consumption.

Preferably, the circuit is constructed so that the receiver circuit needs to supply substantially no current to keep the potential at its input constant in the absence of a pulse. Preferably, the potential is at or below the threshold at which current starts to flow. Thus, power consumption is minimized, because the receiver circuit needs to supply current to keep the potential at its input substantially constant only during pulses.

In an embodiment the receiver circuit comprises a current mirror circuit with an input coupled to the communication conductor and a capacitive voltage measuring circuit coupled to the output of the current mirror. This further reduces power consumption. Preferably, the capacitive voltage measuring circuit comprises a reset transistor and a delay line, coupled to reset a voltage at the output of the current mirror with a delay after detection of a pulse.

In a further embodiment the transmitter comprises a voltage limiting circuit that limits the potential on the communication conductor, at least at the side of the transmitter, in the absence of a pulse substantially to a threshold level of the current mirror circuit. Thus loss of communication speed of the circuit due to a need to pull the potential of the communication conductor past the threshold of the current mirror during a pulse is avoided.

In a further embodiment the receiver circuit comprises a refresh transistor with a main current channel in parallel with the input of the current mirror and a control circuit for making the main current channel of the refresh transistor conductive once the receiver circuit has detected a pulse. The refresh transistor makes it possible to use a small input transistor in the current mirror and still ensure that the effect of a pulse is removed quickly from the communication conductor, at least at the side of the receiver circuit. By making it possible to work with a small input transistor the quiescent power consumption of the receiver circuit is reduced.

A combined data source and receiver circuit may be equipped with both a receiver and a transmitter coupled to the same communication line. The receiver of such a combined circuit can be used in time interval wherein its transmitter does not drive the communication conductor. In the embodiment with a current mirror in the receiver, the current mirror input is preferably placed in series with the main current channels of a push and a pull transistor of the driver, a node between these transistors being coupled to the communication conductor. Thus, the current mirror serves the double function of input during reception and voltage limiting circuit during transmission.

These and other objects and advantageous aspects will be described using the following figures.

Figure 1:
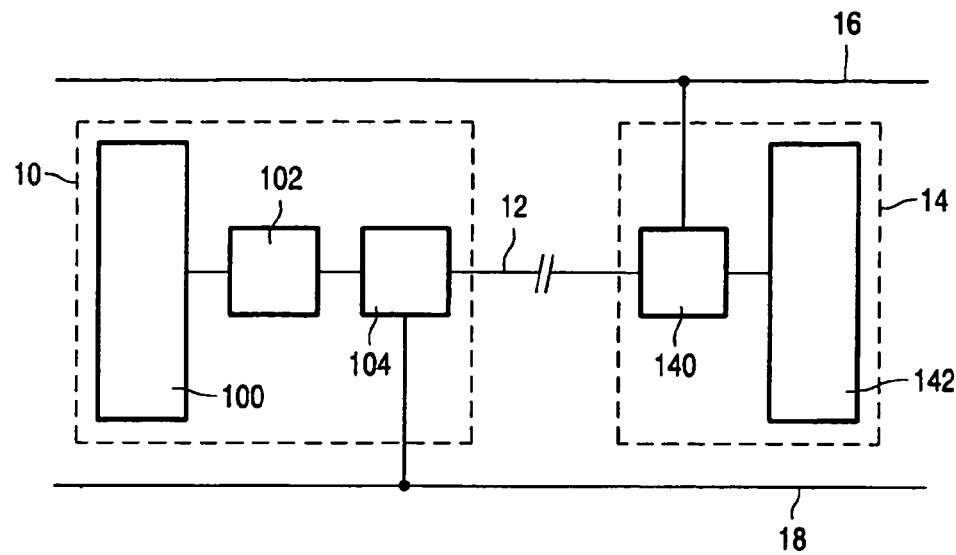
FIG. 1 shows an electronic data processing circuit

FIG. 1 shows a data processing circuit containing a data source circuit 10, a communication conductor 12 and a data receiving circuit 14. The circuit has a first and second power supply line 16, 18. The data source circuit 10 contains a logic circuit 100, a transition pulse generator 102 and a driver 104 in cascade. An output of the driver 104 is coupled to the communication conductor 12. The data receiving circuit 14 contains a current supply and measuring circuit 140 and a further logic circuit 142. All of the circuits are coupled to the power supply lines 16, 18, but only the connections from the power supply lines 16, 18 that directly affect the potential of the power supply conductor are shown; i.e., a connection from the first power supply line 18 to driver 104 and a connection from second power supply line 16 to current supply and measuring circuit 140.

In operation, logic circuit 100 produces data and communicates this data to further logic circuit 142. Communication of data involves transmission from logic circuit 100 via communication conductor 12 using current mode signalling. Logic circuit 100 and further logic circuit are typically sub-circuits within an integrated circuit chip, which are implemented in different areas of the integrated circuit chip that are remote from one another. As a result communication conductor 12 extends over a substantial distance, often amounting to a significant fraction of the integrated circuit size. This poses a problem for the speed of communication: the long communication conductor 12 represents a significant capacitance. To achieve significant voltage changes over the full length of this conductor a charging time is needed each time. The need for such a charging time is eliminated by using current mode signalling.

Transition pulse generator 102 receives the logic signal from logic circuit 100 and generates a pulse each time when the logic level of the logic signal changes. Each pulse generally has the same duration, which is typically much smaller than the minimum time interval between successive transitions in the logic signal (this time interval is typically the clock period of logic circuit 100). Transition pulse generator 102 applies the pulses to driver circuit 104. Driver circuit 104 drives communication conductor 12 in a first state or a second state, dependent on whether driver circuit 104 receives a pulse from transition pulse generator 102. When it receives a pulse, driver circuit 104 supplies a first current from first power supply line 18 to communication conductor 12. When there is no pulse, driver circuit 104 supplies no first current (or at least a much smaller first current) from first power supply line 18 to communication conductor 12.

Current supply and measuring circuit 140 supplies a second current from second power supply line 16 to communication conductor 12 when it detects the first current supplied from first power supply line 18 from driver circuit 104, i.e. when a pulse has been generated in response to a transition in logic signal. The second current counteracts the effect of the first current on the potential of communication conductor 12, to the point of substantially eliminating potential variations on communication conductor 12, at least at the location where the input of current supply and measuring circuit 140 connects to communication conductor 12. Typically the second current equals the first current, so that first current does not result in persistent changing of the potential of communication conductor 12, leaving only transient change. When no effect of such a pulse is present on communication conductor 12 current supply and measuring circuit 140 supplies no second current (or at least a much smaller current) from second power supply line 16.

Current supply and measuring circuit 140 measures the second current that it has to generate to counteract the effect of the first current each time when a pulse has been generated. Each time when a pulse in the second current occurs a pulse from transition pulse generator 102 is detected. From the detected pulses current supply and measuring circuit 140 regenerates the logic signal and applies the regenerated signal to further logic circuit 142.

Thus on one hand the benefits of current mode signalling (high speed) are realized and on the other hand power consumption is reduced by using transition signalling so that in the absence of transitions current supply and measuring circuit 140 draws substantially no current. In any case it will be realized that power used for current mode signalling is saved as soon as current supply and measuring circuit 140 draws less current in the absence of pulses than in the presence of pulses.

Figure 2:
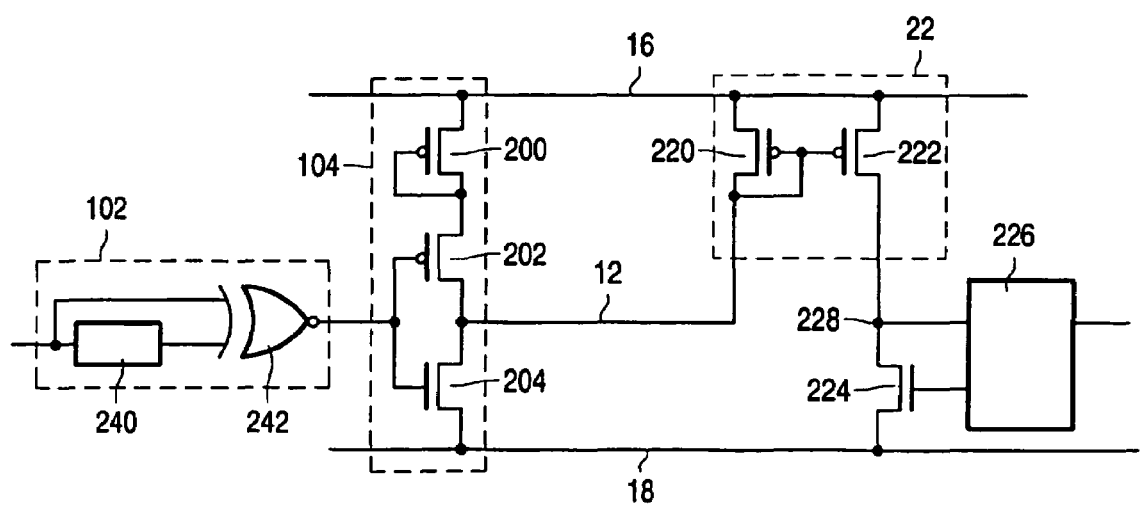
FIG. 2 shows an embodiment of part of an electronic data processing circuit

FIG. 2 shows an embodiment of part of an electronic data processing circuit. The part contains a transition pulse generator 102, a driver 104, a current mirror 22, a reset transistor 224 and a sensing circuit 226. Current mirror 22, reset transistor 224 and sensing circuit 226 are part of an embodiment of current supply and measuring circuit 140. Transition pulse generator 102 contains a delay circuit 240 and an Exclusive Nor gate 242. An input of transition pulse generator 102 is coupled directly to a first input of Exclusive Nor gate 242 and via delay circuit 240 to a second input of Exclusive Nor gate 242.

Driver 104 contains a limiting transistor 200 (of PMOS type), a pull-up transistor 202 (of PMOS type) and a pull-down transistor 204 (of NMOS type). First power supply line 18 is connected to second power supply line 16 via the main current channels of pull-down transistor 204, pull-up transistor 202 and limiting transistor 200 successively. A control electrode of pull-down transistor 204 and pull-up transistor 202 are coupled to an output of exclusive Nor gate 242. A control electrode of limiting transistor 200 is coupled to a node between the main current channels of pull-up transistor 202 and limiting transistor 200. A node between pull-down transistor 204 and pull-up transistor 202 is coupled to communication conductor 12.

Current mirror 22 contains an input transistor 220 of (PMOS type) and an output transistor 222. The main current channel of input transistor 220 is coupled between communication conductor 12 and second power supply line 16. Second power supply line 16 is coupled to first power supply line 18 via the main current channels of output transistor 222 and reset transistor 224 (of NMOS type) successively. The control electrodes of input transistor 220 and output transistor 222 of current mirror 22 are coupled to communication conductor 12. A node 228 between the main current channels of output transistor 222 and reset transistor 224 is coupled to sensing circuit 226, which has outputs coupled to the control electrode of reset transistor 224 and to further logic circuit 142 (not shown).

In operation, Exclusive Nor gate 242 temporarily produces a logic high voltage when the logic signal at the input of transition pulse generator 102 changes. The duration of this logic high pulse is determined by the delay produced by delay circuit 240. Absent a pulse the output voltage of Exclusive Nor gate 242 is logic low. Absent the pulse the main current channel of pull-down transistor 204 is non-conductive and the main current channels of limiting transistor 200 and pull-up transistor 202 are conductive. Thus driver 104 pulls the potential of communication conductor 12 to a level a voltage drop below that of second power supply line 16. The voltage drop corresponds to the gate-source voltage of limiting transistor 200. In a quiescent state this drop will be at or below the threshold voltage of limiting transistor 200. Little or no current flows from driver 104 in this case. As a result little or no current flows from current mirror 22 and no pulse is detected.

In case of a pulse driver 104, driver 104 makes the main current channel of pull-down transistor 204 conductive and driver 104 makes the main current channel of pull-up transistor 202 non-conductive. Thus current flows from first power supply line 18 to communication conductor during the pulse. In response, input transistor 220 supplies current from second power supply line 16 to communication conductor 12. This current counteracts the current supplied by driver 104. Neglecting transients this current would equal the current supplied by driver 104 from first power supply line 18 during pulses, but in practice, due to the length of communication conductor there will be a difference between these two currents at least temporarily. When pull down transistor 204 starts discharging communication conductor 12 during a pulse, one end of communication conductor 12 will start discharging first, the other end at the side of current mirror 22 following later.

Thus input transistor 220 of current mirror 22 responds by counteracting the effect of the current from pull-down transistor 204. This current is mirrored by output transistor 222 of current mirror 22, which cause the potential of node 228 between the main current channels of output transistor 222 and reset transistor 224 to rise. Sensing circuit 226 detects the pulse when this potential passes a threshold. In response, sensing circuit 226 changes the logic signal output to further logic circuit 142 and after a delay sensing circuit 226 makes the main current channel of reset transistor 224 conductive. The delay is preferably at least equal to the delay of delay circuit 240. Thus node 228 between the main current channels of output transistor 222 and reset transistor 224 is discharged after the pulse in preparation for a next pulse.

The voltage drop over limiting transistor 200 serves to reduce the voltage swing on communication conductor 12 to the minimum needed to substantially eliminate current from input transistor 220 of current mirror 22. Thus power consumption is reduced, maintaining substantially maximum speed.

As is typical of current mode receiving circuit, the functions of counteracting potential changes on communication conductor 12 and of measuring the current needed to do so are separated. The current is used to generate a voltage at the output of current mirror 22 and that voltage is used to detect the pulses, whereas the voltage swing at the input of current mirror 22 is kept at a minimum, which is possible because detection imposes no requirements on the voltage swing at the input that is connected to communication conductor.

It will be understood that the circuit of FIG. 2 is merely an advantageous embodiment for use in the circuit of FIG. 1. Different types of current supplying and measuring circuit may be used, such as a circuit using an input transistor in common gate configuration. However, this generally leads to higher current consumption than with the use of a current mirror 22. In many circuits moreover a clock signal is needed to reset the current supplying and measuring circuit, which is not the case with the circuit of FIG. 2. Also, different types of driver circuits or transition pulse generator may be used. For example, a multi-stage driver circuit may be used, to provide strong driving of the communication conductor. The circuits shown in FIG. 2 merely illustrate simple and effective circuits for this purpose. Limiting transistor 200 could be omitted, but this would lead to some an increase in power consumption and a slow down of communication speed.

Figure 3:
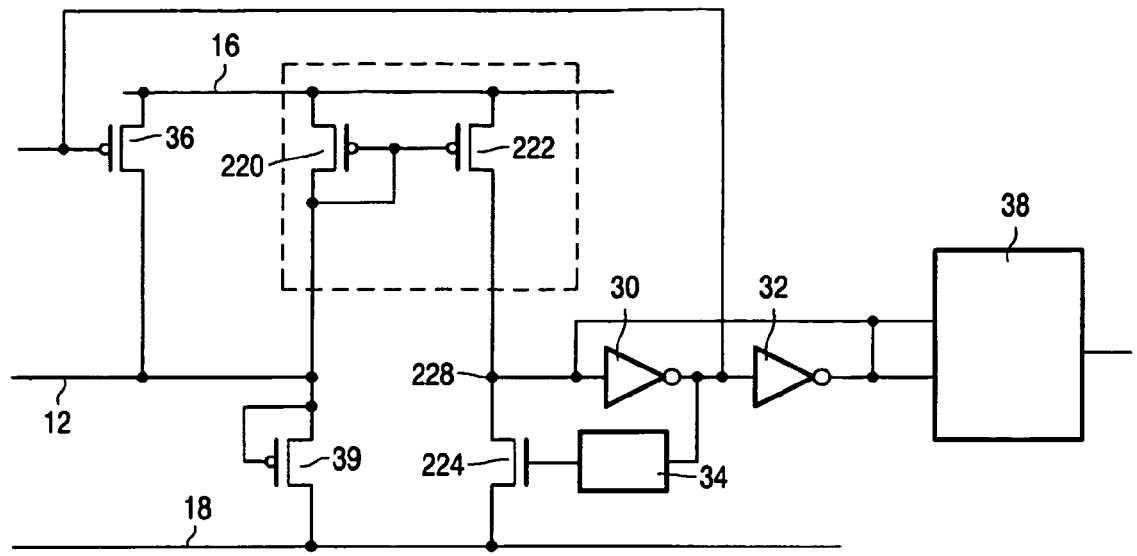
FIG. 3 shows a further receiving circuit

FIG. 3 shows a further receiving circuit. In addition to the components shown in FIG. 2 this circuit contains a pair of cross-coupled inverters 30, 32, a delay circuit 34, a refresh transistor 36 and a logic signal regenerator circuit 38. Furthermore a leakage transistor 39 is shown. A first inverter 30 of the cross coupled inverters has an input coupled to node 228 and an output of a second inverter 32 of the cross coupled inverters, which in turn has an output coupled to node 228. The output of first inverter 30 is coupled to the control electrode of reset transistor 224 via delay circuit 34. Refresh transistor 36 (of PMOS type) has a main current channel coupled in parallel to the main current channel of input transistor 220 between communication conductor 12 and second power supply line 16. The output of first inverter 30 is coupled to the control electrode of refresh transistor 36. The outputs of first and second inverter 30, 34 are coupled to signal regenerator circuit 38. Leakage transistor 39 (of NMOS type) has a main current channel coupled between the input of input transistor 222 and first power supply line 18. Its control electrode is coupled to its drain.

In operation, cross-coupled inverters latch pulses occurring at node 228. For this purpose the drive strength of second inverter 32 is selected to be so weak that it can be overruled by current mirrored from communication conductor 12 during pulses. When the cross-coupled inverters 30, 32 latch a pulse the main current channel of refresh transistor 36 becomes conductive, causing it to assist input transistor 220 in supplying current to counteract current from driver 104. Thus, a relatively small input transistor 220 may be used, which reduces power consumption in the absence of pulses.

Also with a delay after cross-coupled inverters 30, 32 latch a pulse the main current channel of reset transistor 224 is made conductive, to discharge node 228, which causes the latch formed by cross-coupled inverters 30, 32 to be reset, ready for detecting the next pulse. Signal regenerator circuit 38 changes the logic level of its output each time a pulse is detected.

A small leakage transistor 39 supplies a compensatory current to communication conductor 12 that compensates leakage current from input transistor 220 and/or refresh transistor 36 in the absence of pulses. Thus this leakage current does not affect the potential of communication conductor 12. The compensatory current preferably matches leakage current through reset transistor 224 so that node 228 does not charge in the absence of pulses.

It will be appreciated that all the additions to the circuit that have been shown in FIG. 3, such as the refresh transistor, the leakage transistor and the latch, can be made independently, i.e. each addition can be made without making other additions. Although advantageous none of these additions is essential: when it is ensured that pulses are transmitted sufficiently often no leakage transistor is needed, when input transistor 220 is sufficiently strong, or the time interval between pulses is sufficiently long, no refresh transistor is needed etc.

Figure 4:
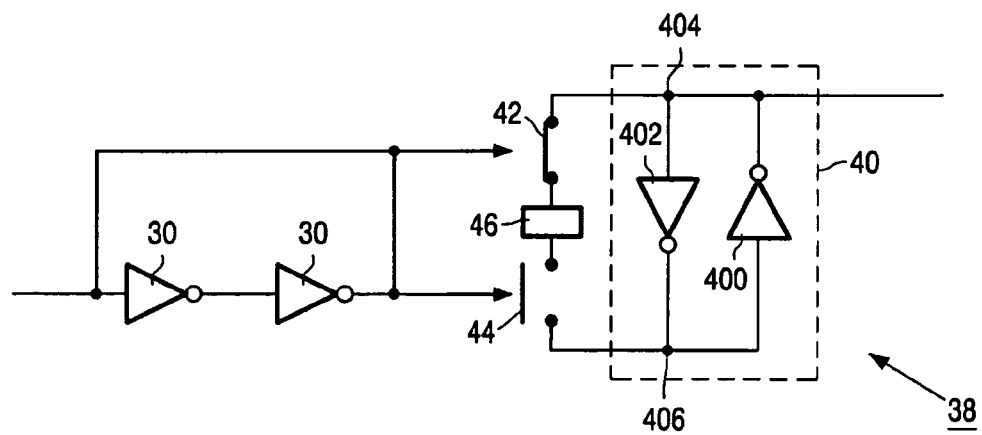
FIG. 4 shows an embodiment of signal regenerator circuit

FIG. 4 shows an embodiment of signal regenerator circuit 38. It contains a latch 40, with further cross-coupled inverters 400, 402, a first and second switch 42, 44 and a delaying buffer 46. Nodes 404, 406 in latch 40 are coupled via a series connection of a first switch 42, delaying buffer 46 and second switch 44. Second and first switches 42, 44 are controlled by the outputs of first and second inverter 30, 32 of the detection circuit respectively. In operation the content of latch 40 is toggled by supplying an output signal of latch 40 transitorily to its input when a pulse has been detected on node 228. Second switch 44 is made conductive during the pulse and first switch 42 is made non-conductive (opposite to situation shown in figure). Thus the old content of latch 40 is supplied back to its input. Absent the pulse first switch 42 is made conductive and second switch 44 is no conductive, thus not supplying an input signal (situation shown).

It will be understood that the regeneration circuit of FIG. 4 in shown merely by way of example: any suitable toggling circuit may be used. Preferably, the circuit contains a reset line (not shown) for synchronizing the output value of the regeneration circuit 38 at least during an initialisation phase (and preferably repeatedly) to the output logic signal of logic circuit 100, for example by resetting the output value to zero at a time when the output signal of logic circuit 100 is logic zero.

In an embodiment, communication conductor 12 may be used for two-way communication. In this case the circuits at both ends of communication conductor are provided with a combination of a driver circuit and a current supplying and measuring circuit.

Figure 5:
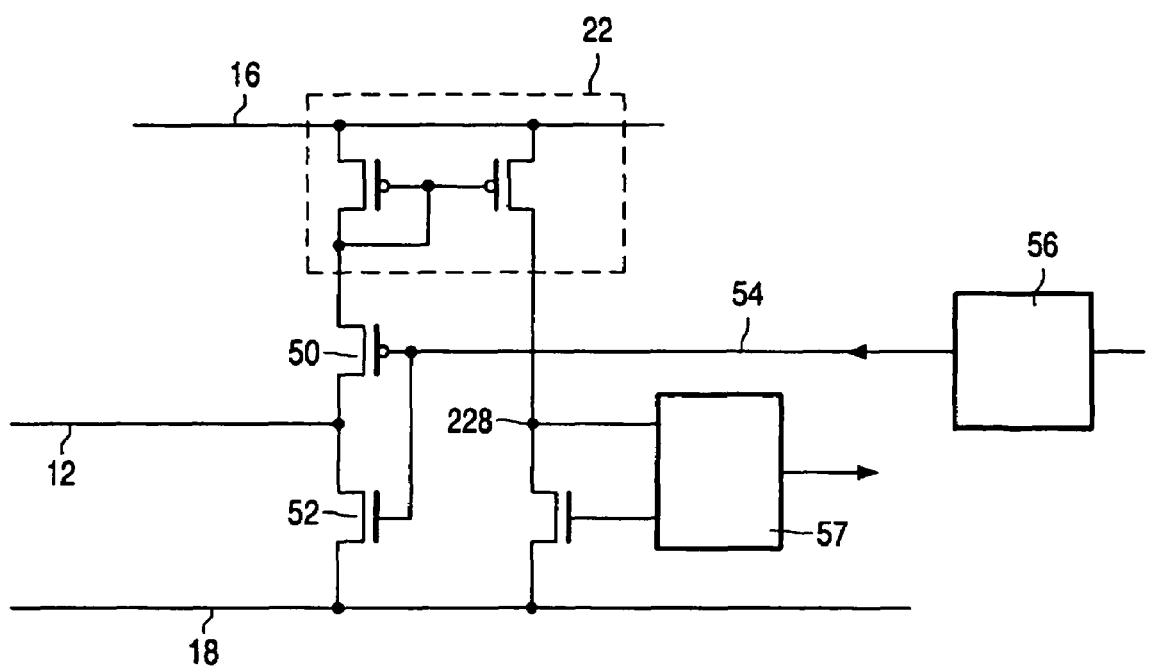
FIG. 5 shows a combination of a transmitter and a receiver.

FIG. 5 shows a combination of a driver circuit and a current supplying and measuring circuit. The circuit contains current mirror 22 and a sensing circuit 57 connected to node 228. In addition, the circuit contains a transition pulse generator circuit 56, a control line 54, a pull-up transistor 50 (of PMOS type) and a pull down transistor 52 (of NMOS type). A main current channel of pull-up transistor 50 is coupled between communication conductor 12 and the input of current mirror 22. A main current channel of pull-down transistor 52 is coupled between communication conductor 12 and first power supply line 18. Transition pulse generator circuit 56 has an output coupled to control line 54 which is coupled to control electrodes of pull-up transistor 50 and pull down transistor 52.

In operation, when transition pulse generator circuit 56 generates no pulses the circuit operates as a current supplying and measuring circuit as described in the context of FIG. 2. In this case pull down transistor 50 merely conducts the current from the input of current mirror 22 and pull-down transistor 52 is non-conductive. When the logic signal supplied to transition pulse generator circuit 56 makes transitions, transition pulse generator circuit 56 generates pulses which make pull-up transistor 50 non-conductive and make pull-down transistor 52 conductive. In this case pulsed currents flow between communication conductor 12 and first power supply conductor 12 and the current sensing and measuring function is deactivated. Between the pulses the input transistor of current mirror 22 functions as limiting transistor.

It will be understood that many variations can be made in the circuit of FIG. 5. For example, one or more of the additions shown in FIG. 3 may be added to the circuit of FIG. 5. A more complicated drive circuit may be used etc.

The invention claimed is:

1. An electronic data processing circuit that uses current mode signalling, the circuit comprising:
   a data source circuit with an output for a logic signal;
   a data receiving circuit;
   a communication conductor; and
   a transition coding circuit coupled between the data source circuit and the communication conductor, for driving the communication conductor in a first state in pulses in response to transitions in the logic signal and in a second state outside the pulses,
   wherein the data receiving circuit comprises a current supply and measuring circuit coupled to the communication conductor for supplying a current to the communication conductor to counteract the driving of the communication conductor, the data processing circuit being constructed so that the current that needs to be supplied is smaller when the communication conductor is driven in the second state than when the communication conductor is driven in the first state, the current supply and measuring circuit recovering the logic signal from measurements of the current,
   and wherein the current supply and measuring circuit defines a threshold potential of the communication conductor at which the current substantially starts increasing from zero, the transition coding circuit and the current supply and measuring circuit being constructed so that the potential of the communication conductor remains at the threshold or on a substantially zero current side of said threshold when the transition coding circuit drives the communication conductor in the second state.

2. The electronic data processing circuit as claimed in claim 1, wherein the current supply and measuring circuit comprises:
   a current mirror circuit with an input coupled to the communication conductor; and
   a capacitive voltage measuring circuit coupled to an output of the current mirror.

3. The electronic data processing circuit as claimed in claim 2, wherein the electronic data processing circuit further comprises a refresh transistor having a main current channel coupled in parallel with the input of the current mirror and a control electrode coupled to an output of the current mirror, said refresh transistor making the main current channel conductive each time when one of the pulses has been detected.

4. The electronic data processing circuit as claimed in claim 2, wherein the transition coding circuit comprises a driver circuit having a first transistor coupled between the communication conductor and a first power supply line, and a series connection of main current channels of a second transistor and a voltage limiting transistor coupled between the communication conductor and a second power supply line, the first transistor driving the communication conductor during pulses, the voltage limiting transistor limiting a voltage level to which the driver circuit drives the communication conductor outside the pulses to a threshold level of the current mirror.

5. The electronic data processing circuit claimed in claim 2, wherein the capacitive voltage measuring circuit comprises:
   a reset transistor having a main current channel coupled to the output of the current mirror, for discharging the output of the current mirror; and
   a delay circuit between the output of the current mirror and a control electrode of the reset transistor for activating said discharging each time with a delay after detecting one of the pulses.

6. The electronic data processing circuit as claimed in claim 2, wherein the current supply and measuring circuit is combined with a further driver, the further driver comprising a first transistor with a main current channel coupled between the communication conductor and a first power supply line in series with the input of the current mirror and a second transistor with a main current channel coupled between the communication conductor and a second power supply line, the data processing circuit being arranged to supply pulses to control electrodes of the first and second transistor, so that the main current channel of the first and second transistor are made conductive and non-conductive respectively during the pulses, when data to be transmitted from the data receiving circuit changes.

* * * * *